(No Model.)
A. L. TEETOR.
BICYCLE.
No. 453,053. Patented May 26, 1891.
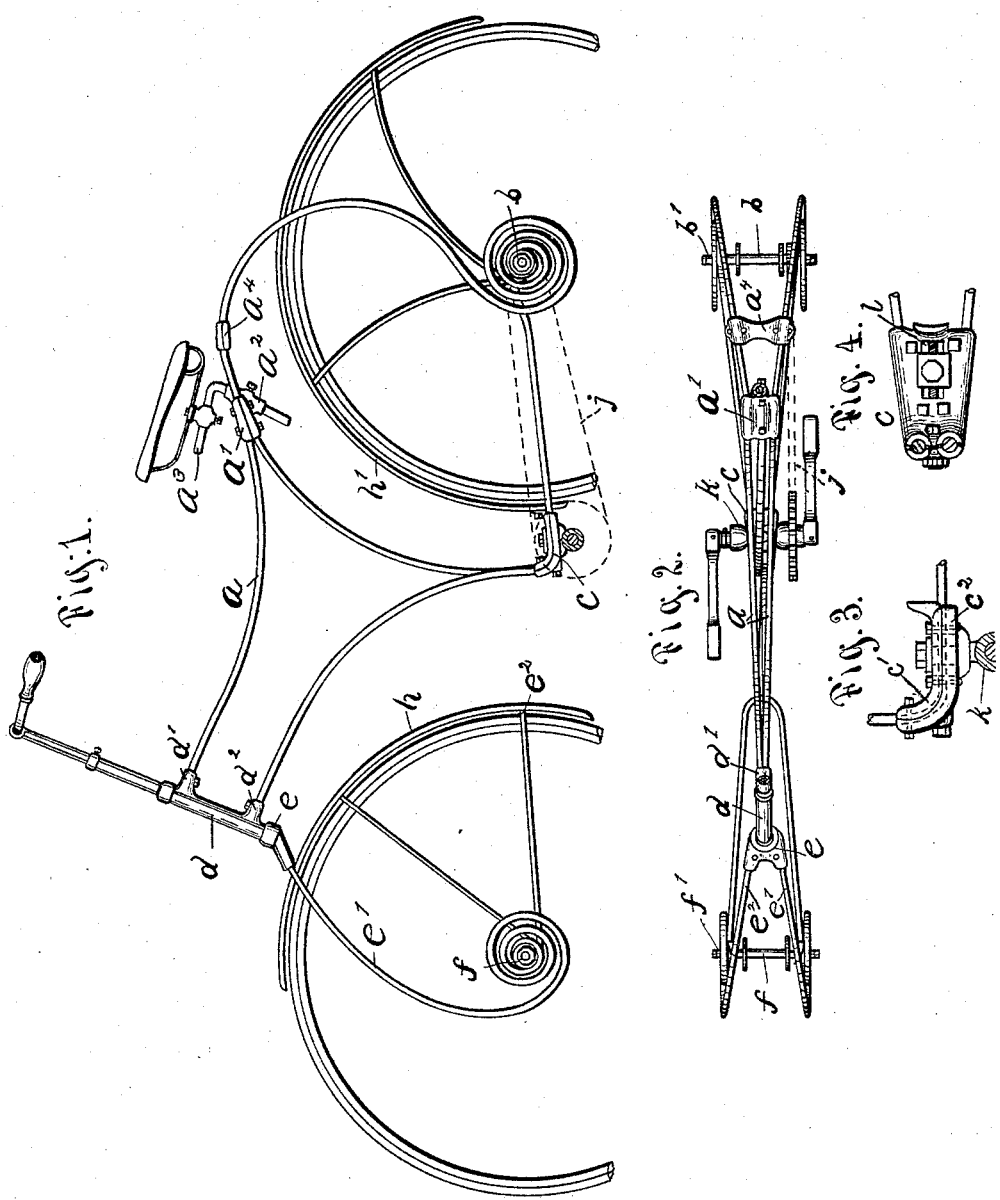
Witnesses.
A. M. Snyder
D. L. Whittier
Inventor.
Abel L. Teetor

UNITED STATES PATENT OFFICE.

ABE L. TEETOR, OF INDIANAPOLIS, INDIANA.

BICYCLE.

SPECIFICATION forming part of Letters Patent No. 453,053, dated May 26, 1891.

Application filed September 13, 1890. Serial No. 364,928. (No model.)

*To all whom it may concern:*

Be it known that I, ABE L. TEETOR, of Indianapolis, Marion county, Indiana, have invented certain new and useful Improvements in Bicycles, of which the following is a specification.

My invention relates to an improvement in bicycles of the class more commonly known as "Safety bicycles," generally having both wheels nearly or quite equal in size—however, not necessarily so.

The objects of my invention are to produce a frame which shall be more elastic than those usually employed; a frame so formed as to produce a spring of great elasticity to be intercepted between the wheels and the frame proper, consequently also between the wheels and the rider, so that in passing over rough roads or obstructions in the way the rider is not subjected to uncomfortable jars or vibrations; a frame formed of bars of spring-steel or other suitable metal or material of any suitable cross-sectional shape, round bars being used in this case; also, means whereby said bars when formed into the desired shape may be securely held in proper position and bound together without a weld, and certain other details of construction, all of which will be hereinafter more fully explained, and will be more clearly understood by reference to the accompanying drawings, in which—

Figure 1 is a side elevation of my machine. Fig. 2 is a plan view showing the disposition of the different bars used in the construction of the frame. Fig. 3 is a side view of the gear-clamp. Fig. 4 is a top view of same.

$a$ is a frame, formed in this case of round bars of spring-steel.

$b$ is the axle for the rear or driving wheel.

$c$ is the center gear-clamp.

$d$ is the steering-head sleeve, to which are securely fastened the ends of the bars $a$, forming the frame.

$e$ is the steering-head, which is journaled in sleeve $d$ and branches into two projections at lower end, in which are secured the ends of the spring-steel bars forming the fork supporting the front or guide wheel.

$f$ is the axle of front wheel.

$h$ is a mud-guard on front wheel.

$h'$ is a mud-guard on drive-wheel.

The frame proper of my machine is composed of two bars $a$, being secured firmly to $d$ at $d'$. Thence, to illustrate, calling this the "starting-point" from which to follow the contour of said bars $a$, they extend through a seat-supporting clamp $a'$, where they are securely bound together, thence continuing through a brace-clamp $a^4$ to the axle $b$, making one or more turns about a spiral core $b'$ on said axle, and then proceeding in a straight line into the center driving-gear clamp $c$, within which is a bend of from fifty to ninety degrees. Thence said bars preferably diverge, as in this case, one reaching the sleeve $d$ and being secured thereto at $d^2$, and the other bar reaching up to the seat-supporting clamp $a'$, to which it is secured. The number of coils about the axle governs the amount of elasticity of the frame in a measure. Thus more or less coils will give more or less elasticity to the frame. The front or spring fork is formed, preferably, in a similar manner, being one bar in this case forming the coils on each side of wheel, thus, to illustrate, one end being securely fastened in one of the branches of $e$, and proceeding to axle $f$, then reaching to $e^2$, thence to axle on opposite side of wheel, forming the desired number of coils, and reaching back to opposite branch of $e$, to which it is securely fastened. The two sides or halves of this fork may be formed of two bars and secured at point $e^2$ in any suitable manner. Of course the sides of frame and steering-fork may be formed of separate pieces and joined at axle to center pieces $b'$ $f'$; but as an assurance of durability it is preferable to form each side of frame and fork of one continuous rod.

The clamp-braces $c, a'$, and $a^4$ are each made in halves, having grooves embracing nearly half the circumference of the bars $a$, of which frame is composed, and of suitable shape to conform to said frame. The upper and lower halves are preferably secured together, as in this case, by bolts or screws. The said grooves in said clamps should be made a shade smaller than the bars, so that they will pinch the bars very tightly when bolted together. The gear-clamp $c$, composed of an upper part $c'$ and a lower part $c^2$, is adapted to embrace the bend in the bars at this point composing the lower part of the frame, said bend ranging from fifty to ninety degrees, as before stated, said clamp having its grooves slightly diverging, so as to support said bars in proper position, as seen in the drawings, and being of sufficient length to extend in either direction along the line of said bars to support them firmly and provide the greatest possible rigidity and strength at this point in the frame where the greatest strain falls. In the center of both upper and lower halves of this clamp is an elongated slot $l$, in which is located a projection rising from the crank-shaft bearing $k$, by which said bearing is held, and in which adjustment is made of this bearing $k$ by means of a screw located in said slot to compensate for wear in the drive-chain $j$.

$a'$ is a clamp, also made of two parts and provided with two or more grooves, there being in this case three, which lie nearly or quite parallel to each other, one of the halves of said clamp being provided with a projection $a^2$, having an eye in which is supported an adjustable seat-supporting arm $a^3$, a set-screw being provided to secure such arm at any desired height.

Having fully described my invention, what I claim as new, and desire to secure by Letters Patent, is pointed out in the following claims:

1. In a frame, the combination of bars of spring material lying side by side with a clamp formed of two parts, each provided with nearly parallel grooves of such depth as to embrace nearly half the circumference of said bars, said clamp being adapted to be located upon a bend in said bars of said frame, one part of said clamp being placed on inner and the other part on outer side of bend and reaching in either direction beyond the bend along the line of said bars, so as to support said bars against all strains, substantially as and for the purposes set forth.

2. In a bicycle, a frame of spring-steel or other flexible metal or material, composed of two or more bars, being connected at one end to sleeve $d$ and extending through a point where the seat is located, where they are securely bound together by suitable clamp and to the axle, about which they make one turn to support the axle, additional turns being employed to give the desired elasticity at this point, then branch off to clamp $c$, where they are securely bound together, and then diverging, one reaching to steering-head and the other to seat-clamp, all as and for the purposes set forth.

3. In a bicycle, a front fork supporting the steering-wheel, composed of spring metal or material reaching from steering-head in two branches to axle $f$, making one or more turns about said axle to support same and provide any desired amount of elasticity, and then extending to a point outside of wheel, where they are joined, providing also a support for mud-guard at $e^2$, substantially as and for the purposes set forth.

In testimony that I claim the foregoing I have hereunto subscribed my name.

ABE L. TEETOR.

Witnesses:
 MARION A. STOGDILL,
 G. W. GIVEN.